United States Patent [19]

Riggle et al.

[11] Patent Number: 5,320,204
[45] Date of Patent: Jun. 14, 1994

[54] ONE-WAY CLUTCH

[75] Inventors: John F. Riggle, Aurora; Raymond V. Pimentel, Glendale Heights, both of Ill.

[73] Assignee: Borg-Warner Automotive, Inc., Sterling Heights, Mich.

[21] Appl. No.: 8,960

[22] Filed: Jan. 26, 1993

[51] Int. Cl.$^5$ .............................................. F16D 41/07
[52] U.S. Cl. .................................. 192/45.1; 192/41 A; 192/113.32
[58] Field of Search .............. 192/45.1, 41 A, 113 LC, 192/113 LR

[56] References Cited

U.S. PATENT DOCUMENTS

| | | | |
|---|---|---|---|
| 2,912,086 | 11/1959 | Troendly et al. | 192/45.1 |
| 3,175,661 | 3/1965 | Maurer et al. | 192/45.1 |
| 3,421,799 | 1/1969 | Tallian et al. | 308/121 |
| 3,533,664 | 10/1970 | Dee | 308/9 |
| 3,575,476 | 4/1971 | Ortman | 308/9 |
| 3,870,382 | 3/1975 | Reinhoudt | 308/9 |
| 3,891,282 | 6/1975 | Tuffias | 308/9 |
| 4,227,753 | 10/1980 | Wilcock | 308/9 |
| 4,459,047 | 7/1984 | Silver | 384/105 |
| 4,462,700 | 7/1984 | Agrawal | 384/105 |
| 4,601,375 | 7/1986 | Hayashi et al. | 192/85 |
| 4,621,930 | 11/1986 | Gu et al. | 384/105 |
| 4,626,226 | 12/1986 | Kajikawa et al. | 464/64 |
| 4,629,047 | 12/1986 | Lu | 192/70.12 |
| 4,639,148 | 1/1987 | Tamura et al. | 384/420 |
| 4,726,695 | 2/1988 | Showalter | 384/121 |
| 4,792,028 | 12/1988 | Nishimura et al. | 192/45.1 X |
| 4,875,564 | 10/1989 | Leitz et al. | 192/45.1 |
| 4,913,271 | 4/1990 | Kinoshita et al. | 192/113 L R |
| 4,928,801 | 5/1990 | Laurent | 192/41 A X |
| 4,958,712 | 9/1990 | Suganuma et al. | 192/70-12 |
| 4,961,486 | 10/1990 | Kinoshita et al. | 192/45.1 X |
| 4,979,600 | 12/1990 | Zanoni | 192/45.1 X |
| 4,986,397 | 1/1991 | Vierk | 192/3.3 |
| 5,016,741 | 5/1991 | Leitz | 192/45.1 |
| 5,035,519 | 7/1991 | Aizawa et al. | 394/121 |
| 5,042,628 | 8/1991 | Malecha | 192/45 |
| 5,052,518 | 10/1991 | Trommer | 192/113 L R |
| 5,076,408 | 12/1991 | Numata et al. | 192/113 L R |
| 5,139,123 | 8/1992 | Rutke | 192/45.1 |
| 5,183,139 | 2/1993 | Malecha | 192/45.1 X |

FOREIGN PATENT DOCUMENTS

| | | | |
|---|---|---|---|
| 59-164422 | 9/1984 | Japan | 192/41 A |
| 59-166729 | 9/1984 | Japan | 192/41 A |

Primary Examiner—Leslie A. Braun
Assistant Examiner—Andrea Pitts
Attorney, Agent, or Firm—Reising, Ethington, Barnard, Perry & Milton

[57] ABSTRACT

A one-way clutch has an inner race, an outer race and a plurality of locking elements that are disposed between the races and that move with respect to one of the races when the clutch is overrunning. The clutch includes at least one end bearing for maintaining concentricity of the races that also adjusts the supply of lubricant inside the one-way clutch hydrodynamically. Several configurations and combinations for the end bearing are disclosed.

25 Claims, 2 Drawing Sheets

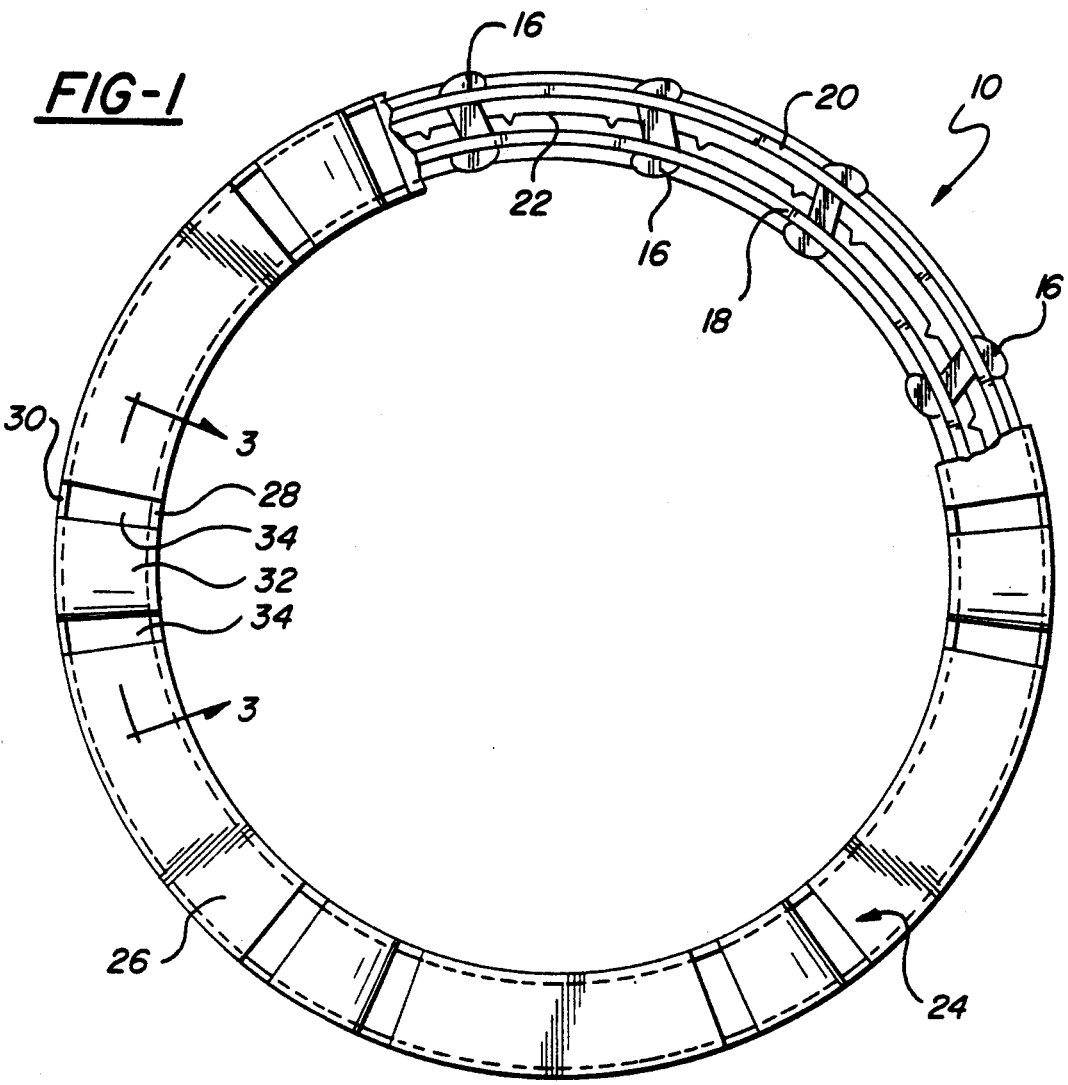
FIG-1
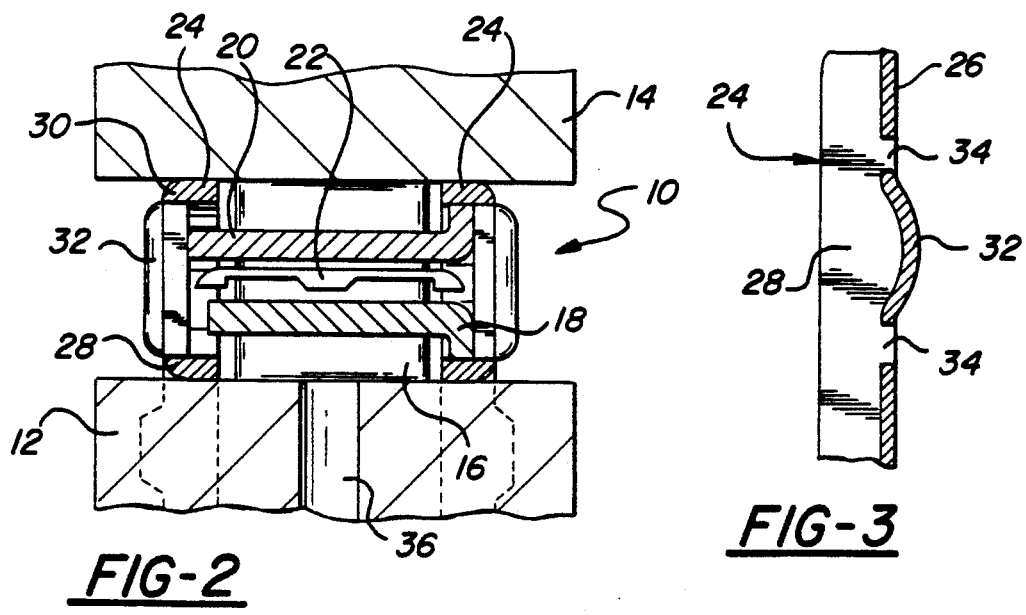
FIG-2
FIG-3

ONE-WAY CLUTCH

BACKGROUND OF THE INVENTION

This invention relates generally to one-way clutches and more particularly to lubrication of one-way clutches that have at least one end bearing for positioning the inner and outer races of the one-way clutch concentrically with respect to each other and maintaining radial spacing between the races in a precise manner.

U.S. Pat. No. 5,042,628 granted to Gregory J. Malecha for a Radial Spacer and Retainer for Roller One-way Clutch discloses a one-way clutch that has an end bearing in the form of a spacer ring. The spacer ring has an inner surface that is supported on a shoulder of the inner race and an outer surface that is supported on a shoulder of the outer race to radially space the inner race and the outer race for precision accommodation of a caged one-way roller clutch sub-assembly in an operating space between the races. The patent specification does not deal with lubrication of the one-way clutch. However, it is well known that there is relative movement between the rollers or other locking elements and one race when the one-way clutch overruns. Consequently it is also well known that is a need to provide a layer of lubrication between the surfaces of the locking elements and the race that moves relative to the locking elements during the overrunning mode of operation.

U.S. Pat. No. 4,961,486 granted to Yoshio Kinoshita et al for a Retainer Plate of a One-way Clutch Assembly Oct. 9, 1990 discloses a one-way sprag clutch that has end bearings on each side for establishing and maintaining concentricity of the inner and outer races with respect to each other. Lubricant is supplied to the interior of the one-way clutch through a radial supply port that extends through the inner race. The end bearings engage retainer plates fastened to the outer race. These retainer plates have radial passages for directing the lubricant that is discharged through gaps at the inner and outer peripheries of the end bearings to lubricate elements outside the end bearings.

U.S. Pat. No. 4,913,271 granted to Yoshio Kinoshita et al for a On-Way Clutch Apr. 3, 1990 also discloses a one-way sprag clutch that has end bearings on each side for maintaining concentricity and a radial supply port that extends through the inner race for supplying lubricant to the interior of the one-way clutch that is discharged through gaps at the inner and outer peripheries of the end bearings. These end bearings are formed with a recessed lubricating oil supply area for expediting the introduction of discharged lubricating oil for lubricating the one-way clutch between exterior surfaces of the end bearings and surfaces sliding relative to these exterior surfaces. Several patterns of recessed lubricant supply areas are disclosed.

SUMMARY OF THE INVENTION

The object of this invention is to provide a one-way clutch that has at least one end bearing that adjusts the supply of lubricant in the interior of the one-way roller clutch in a significant way and hydrodynamically.

A feature of the one-way clutch of the invention is that the one-way clutch has an end bearing that has slots that adjust the supply of lubricant in the interior of the bearing hydrodynamically.

Another feature of the one-way clutch of the invention is that the one-way clutch has an end bearing that can be used on either side of the one-way clutch to adjust the interior lubricant supply hydrodynamically.

Another feature of the one-way clutch is that the one-way clutch has an end bearing that can be used one way to replenish lubricant in the interior of the one-way clutch or another way to discharge lubricant in the interior of the one-way clutch.

Another feature of the one-way clutch is that the one-way clutch has end bearings that can be used to circulate lubricant through the one-way clutch to purge contaminants in the interior of the bearing.

In one aspect a feature of the one-way clutch of the invention is that the one-way clutch has an end bearing that adjusts the interior lubricant supply in the same way on either side of the one-way clutch and irrespective of its direction of rotation.

BRIEF DESCRIPTION OF THE DRAWINGS

The above and other objects, features and advantages of the invention will become more apparent from the following description taken in conjunction with the accompanying drawings wherein like references refer to like parts and wherein:

FIG. 1 is a partially sectioned front view of a subcombination of a one-way clutch having an end bearing in accordance with the invention;

FIG. 2 is a cross sectional view of the one-way clutch that is shown in FIG. 1;

FIG. 3 is a section taken substantially along the line 3—3 of FIG. 1 looking in the direction of the arrows;

DESCRIPTION OF THE INVENTION

Figure 4:
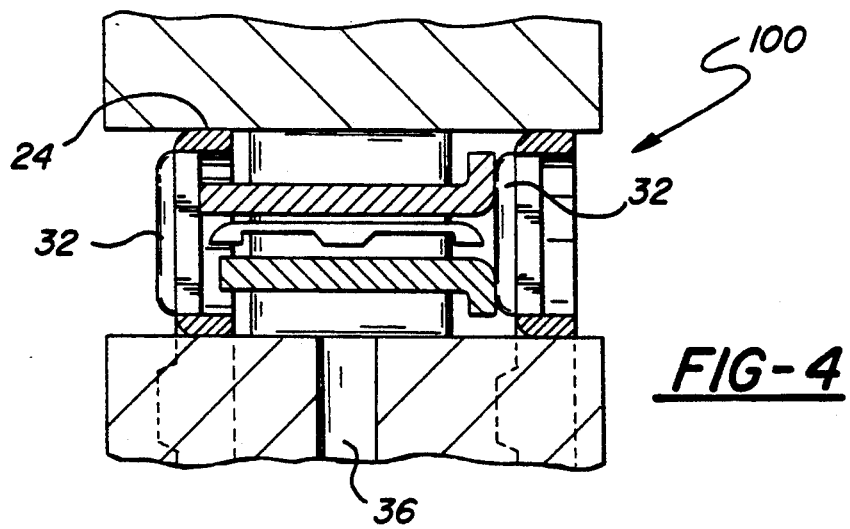
FIG. 4 is a cross sectional view of a similar one-way clutch.

Referring now to the drawing, FIG. 1 shows a subcombination of a one-way clutch 10 that fits between radially spaced inner and outer races 12 and 14 that have confronting cylindrical surfaces as shown in FIG. 2. The one-way clutch 10 comprises a plurality of locking elements in the form of sprags 16 that are circumferentially spaced by inner and outer retainers 18 and 20 that orient the sprags 16 and tilt the sprags 16 in unison in response to the torque input to one of the races. The one-way clutch 10 further includes a ribbon spring represented schematically at 22 that is disposed between the retainers 18 and 20 and that engages the sprags 16 so as to tilt the sprags 16 toward an engaged position.

Sprag clutches and their mode of operation are well known and consequently a detailed explanation of the operation of the sprag clutch is not necessary. Suffice it to say that the sprags 16 are tilted into an engaged position wedged between the races 12 and 14 responsive to torque in one direction with the assistance of the ribbon spring 22 so that one race drives the other in one direction. For instance, the counterclockwise torque applied by an inner race to the sprags shown in FIG. 1 tilts the sprags 16 clockwise wedging the sprags 16 between inner and outer races so that the inner race drives the outer race counter clockwise through the sprags 16. On the other hand clockwise torque applied by an inner race to the sprags 16 shown in FIG. 1 tilts the sprags 16 counterclockwise so that the inner race free wheels or overruns with respect to the outer race in the clockwise direction.

The one-way clutch 10 of FIG. 1 includes an identical end bearing 24 on each side for maintaining the concentricity of the inner and outer races 12 and 14. The end bearing 24 comprises an annular disk-like body 26 that has inner and outer flanges 28 and 30. The inner and outer flanges 28 and 30 are sized to fit the raceways of the inner and outer races 12 and 14 respectively. More specifically one flange is sized for a locational fit with one raceway so that the end bearing rotates with one race, preferably the race that overruns which is usually the outer. The other flange is sized for a running clearance with the other raceway to accommodate relative rotation between the end bearing and the other raceway when the one-way clutch is operating in an overrunning mode.

The annular body 26 has a plurality of circumferentially spaced wings 32 that span the annular body in the radial direction. These wings 32 may be formed by embossments as best shown in FIG. 3 of the drawings or in any other suitable manner such as machining, attachment, etc. In any event, the wing 32 has a smooth exterior surface that is convex in the circumferential direction. The exterior surface is also preferably symmetrical in the circumferential direction so that the end-to-end curvature in the clockwise direction is the same as in the counter clockwise direction. The annular body 26 also has a radial slot 34 on each side of each wing 32 that extends through the annular body 26.

The one-way clutch 10 has an annular space between the inner and outer races 12 and 14 as shown in FIG. 2. The concentricity of the races with respect to each other and the annular spacing between the two races is established and maintained in a precise manner by end bearings 24 on each side of the one-way clutch 10 that are press fit onto a cylindrical shoulder of one race and have a running clearance with a cylindrical shoulder of the other race as is shown in FIG. 2.

To reduce wear between the sprags 16 and the race that moves relative to the sprags 16, a layer of lubrication between the surfaces of the sprags 16 and the race is necessary. This lubrication layer is generated hydrodynamically using a supply of lubricant inside the one-way clutch and the relative velocity of the sprags 16 with respect to the race during overrunning. If the supply of lubricant is reduced or eliminated, metal-to-metal contact between the sprags 16 and the race is possible leading to excessive wear, higher temperatures, and eventual clutch failure.

The end bearings 24 maintain an adequate supply of lubricant in the interior of the one way clutch 10 when at least a lower portion of the one-way clutch 10 resides in a sump or other external lubricant reservoir (not shown). As the wings 32 on the exterior of the end bearings 24 rotate through the external lubricant reservoir (not shown), the external lubricant flows along the convex surfaces of the wings 32 similar to air flowing over an aircraft wing. The external lubricant is then redirected by each wing 32 into the interior of the one-way clutch 10 through the radial slot 30 at the downstream ends of the wings 32. Stated another way, assuming that the end bearing 24 is rotating clockwise in FIG. 1, each wing 32 redirects lubricant from the external lubricant source as it moves through the external lubricant into the interior of the one-way clutch 10 through the trailing slot 34 that follows the wing 24, that is, the slot 34 that is at the end of the wing 24 in the counter clockwise direction. The leading slot 34 at the end of the wing 24 in the clockwise direction is used to direct lubricant into the interior of the one-way clutch 10 when the end bearing rotates 24 in the counterclockwise direction and the leading and trailing slots are reversed. The symmetry of the convex surfaces of the wings 32 and the positioning of radial slots 34 at each end of the wings 32 results in the end bearing 24 directing lubricant into the interior of the one-way clutch 10 irrespective of its direction of rotation and irrespective of which side of the one-way clutch 10 it is attached to.

The end bearings may be used alone or in combination with a lubricant supply passage through one of the races as shown in FIG. 2. It is also possible to use the end bearing of this invention at one side of the one-way clutch 10 and a conventional end bearing or closure or the like at the other side.

FIG. 4 shows another possibility in which a similar one-way clutch 100 has one end bearing 24 attached on one side with its wings 24 facing exteriorly as before. This is the end bearing that is shown on the left side in FIG. 4. This end bearing 24 directs lubricant into the one-way clutch 100 as before. However, the end bearing 24 is attached on the other side, the right side as viewed in FIG. 3, so that the wings 32 face the interior of the one-way clutch 100. Thus this end bearing 24 directs lubricant out of the one-way clutch 100 when it rotates. This combination flows lubricant through the interior of the one-way clutch 100. The left hand end bearing 24 directs lubricant from an exterior reservoir into the one-way clutch 100 while the right hand end bearing 24 flows lubricant from the interior of the one-way clutch 100 back into the external reservoir. This flow through configuration maintains a fresh supply of lubricant in the interior of the one-way clutch 100 and purges contaminants in the interior of the one-way clutch.

It is also possible to use two end bearings 24 that are attached to the one-way clutch race so that their respective wings all face the interior of the one-way clutch, particularly when used in combination with a lubricant supply passage 36 that extends through one of the races.

Figure 5:
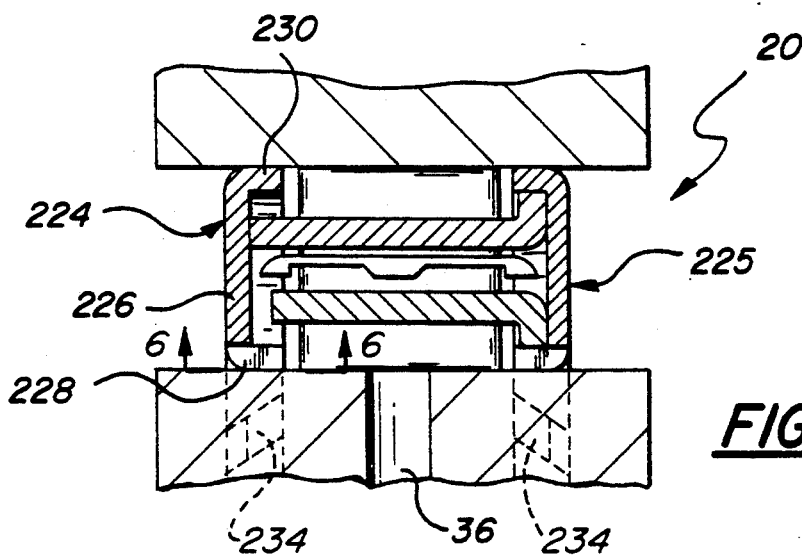
FIG. 5 is a cross sectional view of another embodiment of a one-way clutch according to the invention.
Figure 6:
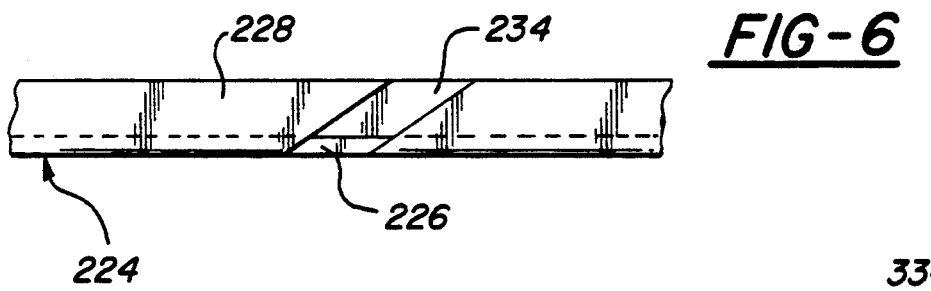
FIG. 6 is a view taken substantially along the line 6—6 of FIG. 5 looking in the direction of the arrows.

FIGS. 5 and 6 show another embodiment of a one-way clutch 200 of the invention. This embodiment of the one-way clutch 200 has different end bearings 224 but it is otherwise the same as the one-way clutches 10 and 100. The end bearings 224 and 225 each have a disk-like annular body 226 that has inner and outer flanges 228 and 230 respectively. However, the body 226 is substantially imperforate and the end bearing 224 has a plurality of circumferentially spaced tangential slots 234 in one flange. In the example shown, the outer flange 230 is locational fit on a cylindrical shoulder of the outer race and the inner flange 228 has the tangential slots 234 as shown in FIG. 6. These slots 234 replenish lubricant in the interior of the one-way clutch 200 from an external reservoir when the end bearing 224 is rotated through the external reservoir. The flange slots in the respective end bearings 224 and 225 are of opposite hand as shown in FIG. 5 so that both replenish the interior of the one-way clutch hydrodynamically when the outer race rotates in one direction. These same end bearings 224 and 225 can be used to exhaust lubricant from the interior of the one-way clutch 200 by reversing the orientation of each end bearing rotation of the outer race or by reversing respective positions of the end bearings 224 and 225. The end bearings 224 and 225 may also be used in a flow through configuration by reversing the orientation of one end bearing 224 or 225 or by using end bearings having the same hand on both sides of the one-way clutch 200. These end bearings 224 and 225 may also be used in a one-way clutch that has a lubricant supply port 36 that extends through one of the races.

Figure 7:
FIG. 7 is a view similar to FIG. 6 of another embodiment of the invention.

FIG. 7 shows another variation of a one-way clutch of the invention which is very similar to the embodiment shown in FIGS. 5 and 6. In this embodiment the end bearings are identical to the end bearing 224 and 225 except that the end bearings have a plurality of circumferentially spaced slots in the inner flange that are spiral shaped as exemplified by the slots 334 shown in FIG. 7. These slots are slightly more efficient that the tangential slots shown in FIGS. 4 and 5.

It is to be noted that the invention is applicable to one-way clutches that have other types of locking elements, such as rollers, even though a sprag clutch has been described for purposes of illustration. In fact the end bearings described above may be used in any device that requires an internal lubricant supply.

In other words, the invention has been described in an illustrative manner, and it is to be understood that the terminology which has been used is intended to be in the nature of words of description rather than of limitation.

Obviously, many modifications and variations of the present invention in light of the above teachings may be made. It is, therefore, to be understood that, within the scope of the appended claims, the invention may be practiced otherwise than as specifically described.

The embodiments of the invention in which an exclusive property or privilege is claimed are defined as follows:

1. A one-way clutch comprising:
   an inner race and an outer race having a plurality of locking elements disposed between the races that move with respect to one of the races when the one-way clutch is in an overrunning mode of operation,
   the one-way clutch being configured to retain a supply of lubricant inside the one-way clutch for providing a layer of lubrication between the locking elements and the one of the races when the one-way clutch is in an overrunning condition; and
   at least one end bearing that is attached to one of the races at a side of the one-way clutch so that it rotates with the one race when the one-way clutch is in an overrunning mode of operation;
   at least one end bearing having an annular body that includes a plurality of circumferentially spaced wings and slots that extend through the body at each end of each wing for hydrodynamically adjusting the supply of lubricant inside the one-way clutch when the one race rotates; and
   the circumferentially spaced wings having surfaces that are convex in a circumferential direction.

2. The one-way clutch as defined in claim 1 wherein the circumferentially spaced wings are embossments in the annular body.

3. The one-way clutch as defined in claim 1 wherein the surfaces are symmetrical in the circumferential direction.

4. The one-way clutch as defined in claim 1 wherein the wings span the annular body in a radial direction.

5. The one-way clutch as defined in claim 1 wherein the one-way clutch includes an identical end bearing on an opposite side of the one-way clutch.

6. The one-way clutch as defined in claim 5 wherein the end bearings are attached so that lubricant is directed into an interior of the one-way clutch.

7. The one-way clutch as defined in claim 5 wherein the end bearings are attached so that lubricant is directed out of an interior of the one-way clutch.

8. The one-way clutch as defined in claim 5 wherein the end bearings are attached so that lubricant is directed through an interior of the one-way clutch.

9. The one-way sprag clutch as defined in claim 1 wherein the locking elements are sprags.

10. A one-way clutch comprising:
    an inner race and an outer race having a plurality of sprags disposed between the races that move with respect to one of the races when the one-way clutch is in an overrunning mode of operation;
    the one-way clutch being configured to retain a supply of lubricant inside the one-way clutch for providing a layer of lubrication between the sprags and the one of the races when the one-way clutch is in an overrunning condition; and
    at least one end bearing that is attached to one of the races at a side of the one-way clutch so that it rotates with the one race when the one-way clutch is in an overrunning mode of operation;
    the at least one end bearing having an annular body that includes a plurality of circumferentially spaces wings and radial slots that extend through the body at each end of the wings for hydrodynamically adjusting the supply of lubricant inside the one-way clutch when the one race rotates.

11. The one-way clutch as defined in claim 10 wherein the circumferentially spaced wings are embossments in the annular body are symmetrical in a circumferential direction and that span the annular body in a radial direction.

12. The one-way clutch as defined in claim 11 wherein the one-way clutch includes an identical end bearing on an opposite side of the one-way clutch.

13. The one-way clutch as defined in claim 12 wherein the end bearings are attached so that lubricant is directed into an interior of the one-way clutch.

14. The one-way clutch as defined in claim 12 wherein the end bearings are attached so that lubricant is directed out of an interior of the one-way clutch.

15. The one-way clutch as defined in claim 12 wherein the end bearings are attached so that lubricant is directed through an interior of the one-way clutch.

16. A one-way clutch comprising:
    an inner race and an outer race having a plurality of locking elements disposed between the races that move with respect to one of the races when the one-way clutch is in an overrunning mode of operation,
    the one-way clutch being configured to retain a supply of lubricant inside the one-way clutch for providing a layer of lubrication between the locking elements and the one race when the one-way clutch is in an overrunning condition; and
    at least one end bearing that has an axis and that is attached to one of the races so that it rotates with the one race when the one-way clutch is in an overrunning mode of operation;
    the one end bearing having an annular body that includes an annular flange at one end that has a plurality of circumferentially spaced slots that are slanted axially with respect to the axis of the end bearing for hydrodynamically adjusting the supply of lubricant inside the one-way clutch when the one race rotates.

17. The one-way clutch as defined in claim 16 wherein the annular body is essentially imperforate and the slots extend solely through the flange.

18. The one-way clutch as defined in claim 16 wherein the slots are tangential slots.

19. The one-way clutch as defined in claim 16 wherein the slots are spiral slots.

20. The one-way clutch as defined in claim 16 wherein the one-way clutch includes an identical end bearing of opposite hand on an opposite side of the one-way clutch.

21. The one-way clutch as defined in claim 16 wherein the one-way clutch includes an identical end bearing of the same hand on an opposite side of the one-way clutch.

22. The one-way clutch as defined in claim 16 wherein the end bearings are attached so that lubricant is directed into an interior of the one-way clutch.

23. The one-way roller clutch as defined in claim 16 wherein the end bearings are attached so that lubricant is directed out of an interior of the one-way clutch.

24. The one-way clutch as defined in claim 16 wherein the end bearings are attached so that lubricant is directed through an interior of the one-way clutch.

25. The one-way clutch as defined in claim 16 wherein the locking elements are sprags.

* * * * *